F. E. BOCORSELSKI.
ANTIFRICTIONAL DEVICE FOR RELATIVELY MOVABLE PARTS.
APPLICATION FILED MAR. 22, 1913.
1,094,972.
Patented Apr. 28, 1914.
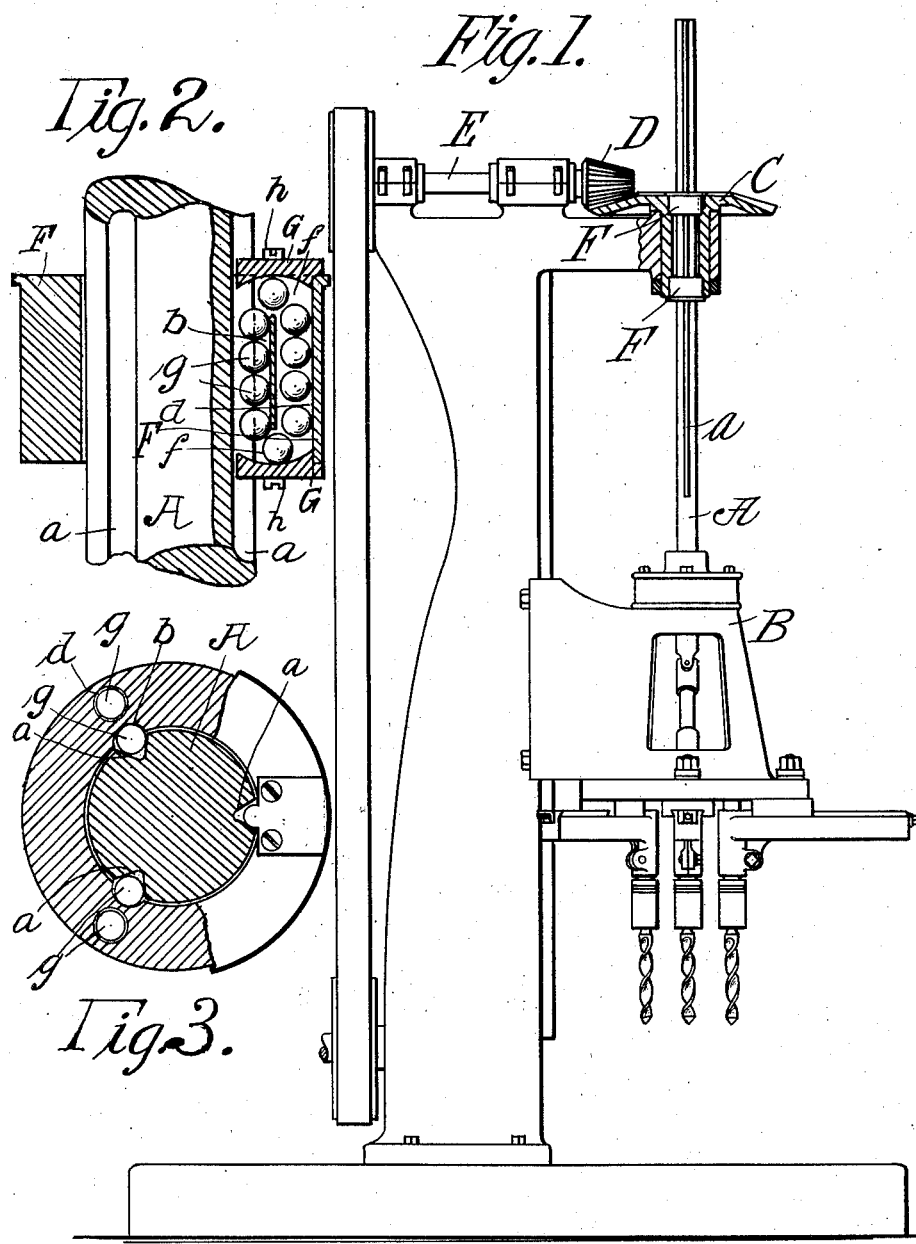
WITNESSES:
H. L. Sprague
W. P. Noble
INVENTOR,
Frank E. Bocorselski,
BY
ATTORNEY.

UNITED STATES PATENT OFFICE.

FRANK E. BOCORSELSKI, OF RICHMOND, VIRGINIA.

ANTIFRICTIONAL DEVICE FOR RELATIVELY MOVABLE PARTS.

1,094,972. Specification of Letters Patent. Patented Apr. 28, 1914.

Application filed March 22, 1913. Serial No. 756,080.

*To all whom it may concern:*

Be it known that I, FRANK E. BOCORSELSKI, a citizen of the United States of America, and resident of Richmond, in the county of Henrico and State of Virginia, have invented certain new and useful Improvements in Antifrictional Devices for Relatively Movable Parts, of which the following is a full, clear, and exact description.

This invention relates to the provision, in a novel manner, in and between relatively movable parts, of rolling members for antifrictional effects.

An object of the invention is to provide a raceway in one of the relatively movable parts of an endless loop form so that the rolling members therein may have a continuously progressive round about traveling movement in such race way whereby there is an avoidance of binding or cramping of such rolling members leaving them free for the easiest and most frictionless rolling actions, the one relatively to the other and to the walls of the channel in which they are accommodated as well as in their relations to the surface of the part which is adjacent and movable relatively to the part which is equipped with the anti-friction device.

Another object is to combine an antifriction device comprising rolling members in a channel in one of two associated and conjointly rotative parts which parts, however, may slide one along the other, and the second one of which has a longitudinal groove therein within which portions of the bulk of the rolling members engage whereby in addition to the easy sliding movement of the first part relatively to the second, or vice versa, the rolling members serve as a spline to prevent independent rotative movement of the one in relation to the other. And another object is to provide such a construction and combination of the parts as conduces to simplicity, cheapness of manufacture, and easy assemblage and disassemblage for replacement or repair.

The invention is described in conjunction with the accompanying drawings and is set forth in the claims.

In the drawings:—Figure 1 is a sectional elevation showing as an example a situation in which my improved anti-friction device is available. Fig. 2 is a sectional elevation of a longitudinally grooved shaft and an annular member encircling same and equipped with the anti-friction devices. Fig. 3 is a partial plan and horizontal cross sectional view of the part shown in Fig. 2.

Similar characters of reference indicate corresponding parts in all of the views.

Referring to the example of the device illustrated in Figs. 1, 2 and 3 A represents a shaft, such, for instance, as comprised in a drilling machine, movable bodily with the head B to which a vertical feed motion (not shown) is provided, and having in effect a spline engagement with a bevel gear wheel C meshing with which is a bevel pinion D on the power driven shaft E. In this class of machines the shaft A is spline engaged through the elongated hub of the bevel gear wheel C so that while partaking of the rotary movement of the gear the shaft may have a rising and falling sliding movement through such gear. The shaft has a plurality of grooves *a* longitudinally and in parallelism along the periphery thereof and in the present instance arranged at thirds. The gear or other annular member has directly therein, or within an annular bushing member fitted and secured in the gear, a plurality of race ways for rolling members, in number corresponding to that of the shaft grooves. Each race way comprises a pair of substantially parallel channels, one of which channels *b* opens to the inner wall of the annular member, the other, *d*, being transversely offset from the one *b*,—these channels having ways *f* in continuation of and uniting therein one with another, thus forming a loop-shaped race way in which the rolling members *g*, here represented as balls, may have a continuously progressive and round about movement in either direction. The balls are of such size relatively to the depth of the channel *b* as to have considerable portions of their bulk protruding beyond the mouth of the channel and to enter in engagement in the adjacent longitudinal groove of the shaft.

In practice, when the collar-like member F is made as represented in Fig. 2, the channels *b* and *d* comprised in the loop-shaped race way are formed in the ends of such part F and the removable cap plates having curved inner surfaces form closures for the channel end uniting ways *f*. These cap plates are held in place by screws *h*, and they are made with arc shaped tongues *i* which protrude inwardly into the shaft grooves and prevent dirt or dust or any extraneous matter from entering by way of the grooves to within the ball races.

It is to be appreciated that in drilling machines of the type here illustrated the sliding movement of the shaft relatively to the collar member through which it has a spline engagement moves in a hard manner when necessarily overcoming the bind occasioned by the turning force of the gear wheel, and which latter through the spline cramps the shaft; but by the provision of the anti-friction device such as shown and described, the balls, constituting the medium for preventing independent rotary movement of the shaft relatively to the gear which encircles it, having the freest possible rolling movements, overcome all tendency of the parts to become bound or cramped, but on the other hand insure the freest and easiest movements of the one axially in relation to the other. And although I have shown and particularly described the anti-friction device as combined in a drilling machine, the invention is, as manifest, advantageously available in the sliding collar which encircles the shaft of a clutch.

The example of the employment of the anti-friction devices last given indicates that the same is not necessarily confined to employment in conjointly rotating parts one of which is movable axially relatively to the other; and although several indications of situations in which the device may be beneficially employed have been herein made and a particular structural formation of the device has been shown and described, uses in other situations and various changes in respect to minor details of construction may be made within the scope of the invention and the purview of the claims without departure from the invention.

I claim:—

The combination of a shaft having longitudinal grooves and supported for rotary movement, of a collar embracing the shaft and provided with transverse ball-raceways longitudinally alined with the longitudinal shaft grooves, and also provided with ball-raceways in parallelism with the first ball-raceways and communicating therewith to provide a continuous ball circulation transverse to the collar, balls movable in the raceways and in the shaft grooves and adapted to spline the collar to the shaft to prevent relative rotary movement, and plates having noses projecting into the shaft grooves for holding the balls in place, the balls disposed in the innermost raceways being adapted to snugly fit in the shaft grooves and the collar being adapted to be actuated to rotate the shaft and the shaft being adapted to be actuated to rotate the collar.

Signed by me at Springfield, Mass., in presence of two subscribing witnesses.

FRANK E. BOCORSELSKI.

Witnesses:
 WM. S. BELLOWS,
 G. R. DRISCOLL.